United States Patent [19]
Karp

[11] 3,942,597
[45] Mar. 9, 1976

[54] BALANCING MEANS FOR A WEIGHING SCALE

[75] Inventor: Edward C. Karp, Belvidere, Ill.

[73] Assignee: Sanitary Scale Company, Belvidere, Ill.

[22] Filed: May 23, 1975

[21] Appl. No.: 580,154

[52] U.S. Cl.............................. 177/230; 177/225
[51] Int. Cl.² ...................................... G01G 23/00
[58] Field of Search .......... 177/201, 225, 230, 226, 177/227, 228

[56] References Cited
UNITED STATES PATENTS

| | | | |
|---|---|---|---|
| 3,181,634 | 5/1964 | Williams | 177/230 X |
| 3,308,900 | 3/1967 | Karp | 177/230 |

*Primary Examiner*—Joseph W. Hartary
*Attorney, Agent, or Firm*—Wetzel, Greenawalt & Fitzgibbon

[57] ABSTRACT

The disclosure relates to a balancing means for a weighing scale which compensates for non-linearities in the weighing mechanism to thereby render the scale platform displacement load weight relation linear. The balancing means includes a rotatable wheel which is coupled to the scale platform for rotating with platform displacement. A shaft having an axis of rotation concentric with the rotatable wheel axis of rotation and a plurality of radially extending and arcuately spaced balance weights rotates with the rotatable wheel. As the platform is displaced and the rotatable wheel rotates, the balance weights act upon the weighing mechanism to render the relation between load weight and platform displacement linear.

9 Claims, 4 Drawing Figures

BALANCING MEANS FOR A WEIGHING SCALE

BACKGROUND OF THE INVENTION

The present invention is generally directed to an improved weighing scale and in particular to an improved weighing mechanism for a weighing scale.

Weighing scales are well-known in the prior art. They find considerable use in commercial weighing operations and in particular in retail food operations. In such use, it is absolutely necessary that strict accuracy and equity be maintained. Consumers are concerned that they receive full weight and value while merchants wish to avoid embarrassing possible prosecution for short weight but yet must be assured of full legitimate profit to survive. Inasmuch as net profit in retail operations today may sometimes not exceed one-half of 1%, weighing scales in such use must be extremely accurate.

Virtually all weighing scales require that the relation between platform displacement and load weight be linear because they include mechanical readout mechanisms having equally spaced graduations or encoders for digital readouts which generate weight indicative pulses, the number of such pulses being proportionnal to platform displacement. Conventional cylinder scales or others having rotary opto-electrical encoding disks or the like typically include traditional rotating balancing and calibrating techniques through the addition of balancing lugs, transverse screws and the like to derive the required linear relation. However, later scales having no such rotary means incident to display or encoding have required the development of other balancing means to secure the required linearity. Unfortunately, the balancing means heretofor developed have in use been difficult to adjust and introduce undesirable friction, hysteresis or even their own non-linear characteristic.

It is therefore an object of the present invention to provide an improved weighing scale.

It is a further object of the present invention to provide a balancing means for a weighing scale which causes the relation between scale platform displacement and load weight to be substantially linear.

It is a still further object of the present invention to provide an adjustable balancing means for a weighing scale to thereby allow the relation between scale platform displacement and load weight to be adjusted for linearity.

SUMMARY OF THE INVENTION

The invention provides, in a weighing scale apparatus of the type which includes a platform upon which a load to be weighed is placed, a resilient means coupled to the platform and to a stationary portion of the scale for causing the platform to be displaced from a reference position by an amount related to the weight of the load on the platform, and weight indicating means coupled to the platform for indicating the weight of the load on the platform responsive to the degree of platform displacement, the improvement of a balancing means for compensating for non-linearities in platform displacement to thereby cause the relation between load weight and platform displacement to be substantially linear. The balancing means comprises a rotatable wheel having an axis of rotation, a level arm pivoted at a pivot point at one end and coupled to said platform for being arcuately displaced by said platform, coupling means including a substantially transverse member at the other end of the lever arm and a ribbon having two ends and an inner elongated slot, the ribbon being wrapped about the wheel with a portion of the ribbon passing through the slot and attached to the transverse member at its ends for causing the wheel to rotate with platform displacement while minimizing friction by exerting only forces on the wheel which are transverse to the axis of rotation, a shaft extending from the rotatable wheel having an axis of rotation concentric with that of the wheel and a plurality of balance weights extending radially from the shaft and arcuately spaced apart from one another. As the platform is displaced by a load on the platform, the wheel is rotated causing the balance weights to act upon the platform and resilient means to thereby render the load weight and platform displacement relationship substantially linear.

BRIEF DESCRIPTION OF THE DRAWINGS

The invention, together with the objects and advantages thereof, may best be understood by reference to the following description taken in conjunction with the accompanying drawings, and in the several figures of which like reference numerals identify like elements, and in which.

DESCRIPTION OF THE PREFERRED EMBODIMENT

Figure 1:
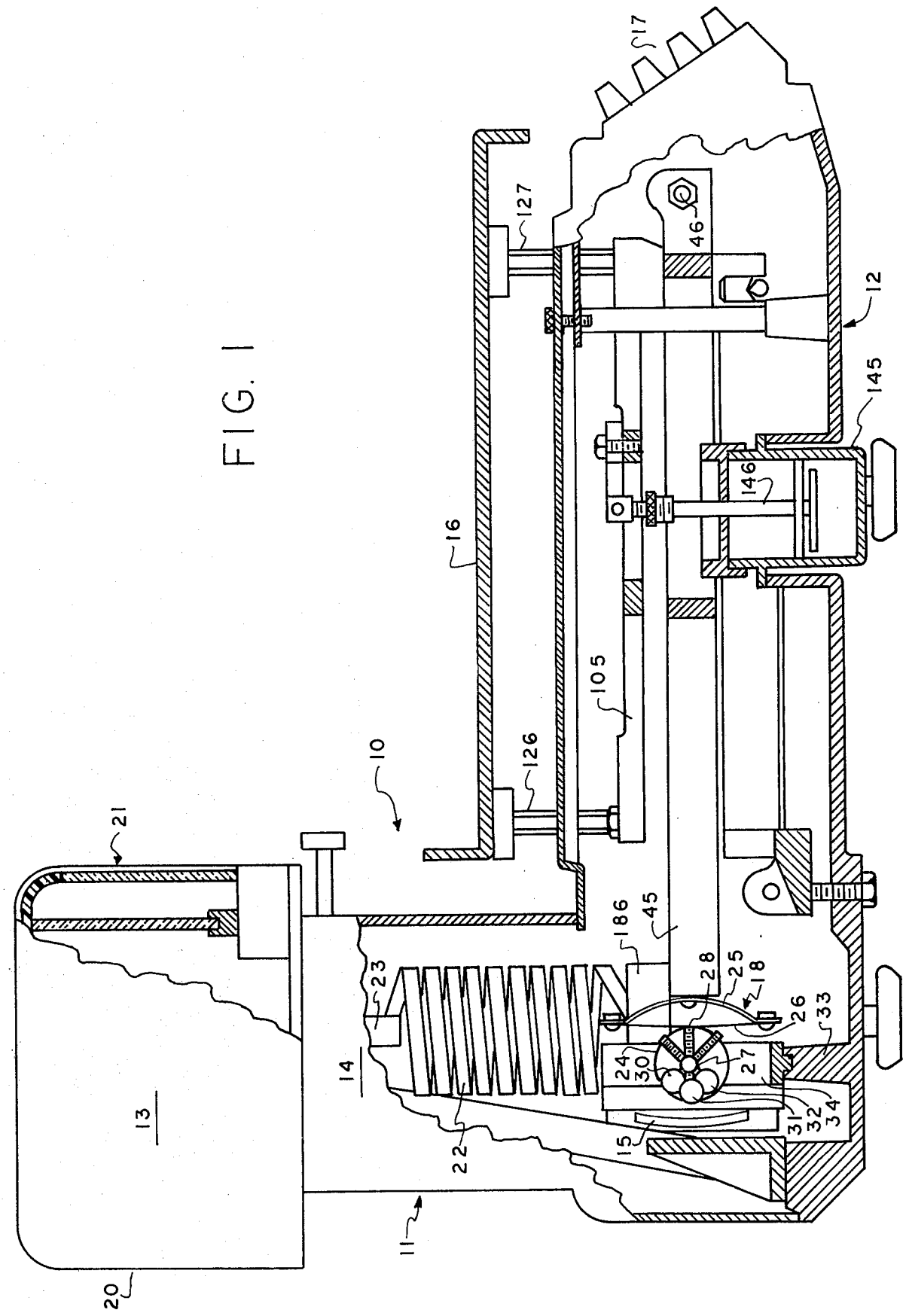
FIG. 1 is a side view, partially cut away of a weighing scale embodying the present invention.

Referring now to FIG. 1, the scale 10 thereshown which embodies the present invention includes an upstanding housing portion 11 and a horizontal housing portion 12.

The horizontal housing portion 12 comprises platform 16, long lever arm 45, platform skeleton 105, dashpot 145, keyboard 17 and balancing means generally designated at 18 which embodies the present invention.

Long lever arm 45 is pivotable about pivot point 46 and is mechanically linked to platform 16 by motion transforming means including standards 126, 127 and platform skeleton 105. The motion transforming means transforms the purely vertical movement of platform 16 brought about by the placing of a load to be weighed thereon to arcuate motion of long lever arm 45 about pivot 46 in a manner which is fully described in U.S. Pat. No. 3,308,900 which issued on Mar. 14, 1967 in the name of Edward C. Karp and which is assigned to the assignee of the present invention. Dash pot 145 is coupled to platform skeleton 105 by piston 146 to damp the motion of platform 16, long arm 45 and platform skeleton 105 in a manner fully described in the aforementioned patent.

The upstanding housing portion 11 comprises upper housing 13 and lower housing 14. Upper housing 13 may include electronic circuit boards which provide weight and price computations and display. Upper housing 13 preferably includes a front display at 20 and a duplicated rear display at 21. The display may for example comprise multiple segment display tubes and the circuit boards may preferably contain electronic circuitry of the type fully described in co-pending patent application Ser. No. 564,416 entitled Improved Digital Scale, which was filed Apr. 2, 1975, in the names of Colin E. Foster and Edward C. Karp and assigned to the assignee of the present invention.

The horizontal housing portion 12 also includes a reticle assembly 15 which is coupled to long arm 45 by a top extension 186. As fully described in the aforementioned co-pending application, the reticle assembly provides arcuately derived up and down counting pulses responsive to the degree and direction of motion of long arm 45 to be counted and utilized by the electronic circuits within upper housing 13 for computing net weights, individual net prices, and total net prices.

Keyboard 17 is coupled to the electronic circuits in a manner fully described in the aforementioned co-pending application. It provides unit weight price rate signals, manual tare signals etc. to be utilized by the electronic circuitry.

Lower housing 14 includes a resilient means or spring 22 which is coupled to a stationary portion of the scale at 23 at one end and to the long arm top extension 186 at the other. Because long arm 45, platform skeleton 105 and platform 16 are all coupled together, the spring causes platform 16 to be displaced from a reference position by an amount related to the weight of the load placed thereon. In all scales, whether of the type purely mechanical display or digital electronic display it is preferable to have the relation between platform displacement and load weight be linear. In the case of mechanical readouts, unit weight graduations may be equally spaced which is not only easier to manufacture, but more importantly, easier to read and interpret. In the case of digital scales, such as the one described in the aforementioned co-pending application wherein up and down counting pulses are generated by a reticle assembly, the linear relation allows the reticle lines to be equally spaced thus assuring that each pulse so produced corresponds to one weight unit increment.

While the desired linear relationship could, theoretically, be obtained by appropriate geometry and absolute control in manufacture, such is not practicable. It has been desirable, instead, to provide supplementary, adjustable compensating means for securing linearity, both in manufacture (to allow for ordinary variance in manufacture) and upon the occasion of repair or overhaul after extensive use. The balancing means 18 of the scale of FIG. 1 which embodies the present invention readily compensates for the non-linearities to make the platform displacement load weight relation substantially linear over the entire range of the scale.

The balancing means 18 comprises a rotatable wheel 24, a substantially transverse bow-shaped member 25, a ribbon 26, a shaft 27 and a plurality of balance weights 30, 31 and 32. The rotatable wheel 24 and shaft 27 are mounted to the bottom of horizontal housing 12 by a support bracket 33 and a U-shaped bracket 34. A more detailed representation of balancing means 18 is shown in FIG. 2 which is a side view thereof and in FIG. 3 which is a partial front view of the balancing means of FIG. 2.

Figure 2:
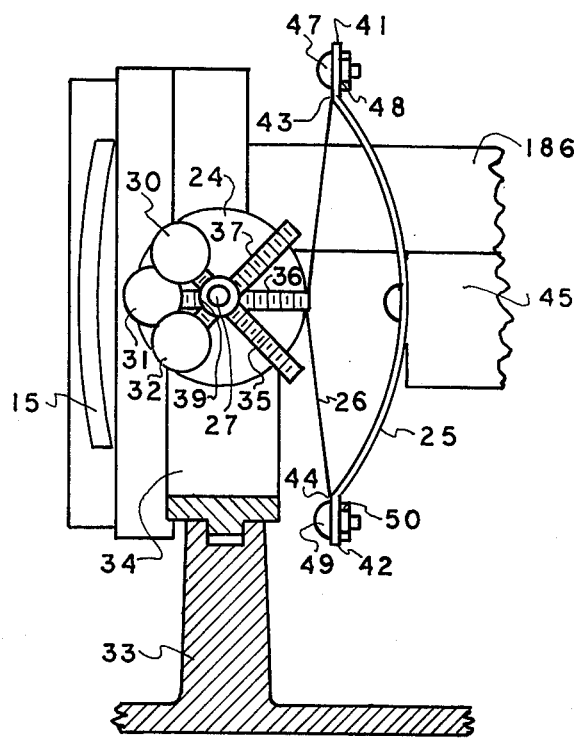
FIG. 2 is a detailed partial side view, partly in cross section, of a balancing means embodying the present invention.
Figure 3:
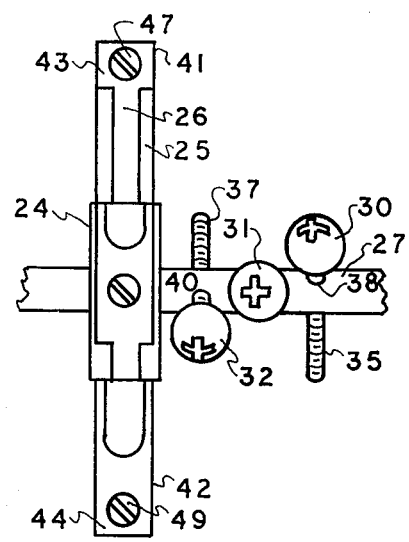
FIG. 3 is a partial front view of the balancing means of FIG. 2.

Referring now to FIGS. 2 and 3, shaft 27 passes through the center of rotatable wheel 24 thereby having an axis of rotation concentric with the axis of rotation of rotatable wheel 24. The shaft 27 extends away from rotatable wheel 24 in opposite directions and terminates at each end of U-shaped bracket 34 in a well-known manner. U-shaped bracket preferably has jeweled bearings for receiving each end of shaft 27 to thereby allow rotation of shaft 27 with minimum friction.

Balance weights 30, 31 and 32 as shown extend radially from shaft 27 and are arcuately spaced by 45° from one another. As more clearly seen in FIG. 3, the balance weights are also longitudinally spaced along shaft 27.

Each balance weight 30, 31 and 32 includes a threaded portion 35, 36 and 37 respectively received by threaded holes 38, 39 and 40 respectively of shaft 27. This allows each balance weight to be screwed in and out with rotation to render the moment arm force exerted by each on shaft 27 adjustable.

The bow-shaped member 25 and ribbon 26 comprise a coupling means which couples the rotatable wheel 24 to long arm 45. Because long arm 45 is coupled to the weighing platform, this serves to couple the balance wheel to the platform 16. The bow-shaped member 25 has a first end 41 and a second end 42 and as shown is bowed away from rotatable wheel 24. Ribbon 26 has a first end 43 and a second end 44. Ribbon 26 is wrapped around rotatable wheel 24 and is secured to the bow-shaped member first end 41 at its first end 43 by screw 47 and nut 48 and to the bow-shaped member second end 42 at its second end 44 by screw 49 and nut 50. With long arm 45 being coupled to rotatable wheel 24 in this manner, a load placed onto platform 16 will cause it and long arm 45 to be displaced causing rotatable wheel 24 and shaft 27 to rotate.

Figure 4:
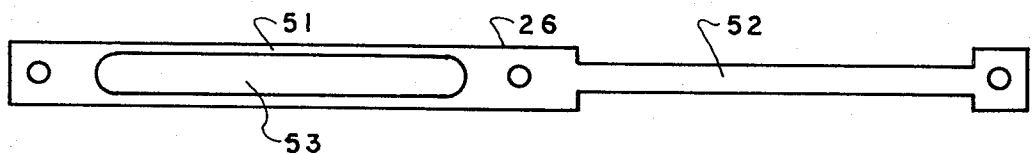
FIG. 4 is a top view showing any other aspect of the present invention.

A preferred form of ribbon 26 is shown in FIG. 4. Ribbon 26 includes a first portion 51 and a second portion 52. The width of the first portion 51 is greater than the width of the second portion and contains an elongated slot 53 which is dimensioned for receiving the first portion. The ribbon 26 of FIG. 4 therefore may be wrapped around rotatable wheel 24 by inserting the second portion 52 through slot 53 and sliding it over the rotatable wheel. This preferred ribbon configuration allows for an overlapping 360° wrap about the wheel 24 without introducing undesirable vectors or friction by exerting only forces on the wheel which are transverse to its axis of rotation. The ends of the ribbon may then be secured to the bowshaped member ends in the previously described manner. It is preferable that the bow-shaped member be placed under tension and that the ribbon be metallic, constructed out of elgiloy. Also to maximize linearities, it is preferable to space the bow-shaped member from the rotatable wheel so that the ribbon acts upon the rotatable wheel at 28 which is a point along an arc tangent to the wheel at 28 and which has pivot 46 as its center. The arcuate relationship of the lever arm 45 to the rotating wheel 24 and the arcuate tangential actuation of the wheel by the lever arm provides the most nearly linear resultant, compensating loading. Such spacing is shown in FIGS. 1 and 2.

In operation, when a load is placed onto platform 16, the weight of the load causes the platform to be displaced. As the platform is being displaced, the coupling means comprising bow-shaped member 25 and ribbon 26 causes the rotatable wheel to be rotated. The shaft 27 therefore rotates allowing the balance weights 30, 31 and 32 to act upon the platform and spring 22 to thereby compensate for non-linearities within the system. In this manner, the balancing means of the present invention renders the relation between platform displacement and load weight substantially linear.

In a preferred form, each balance weight corresponds to one-quarter scale capacity. Therefore balance weight 31 is screwed in and out until the scale provides an exact reading at half capacity and then the other two balance weights are adjusted for one-quarter and three-quarter capacity. Further adjustment may be necessary in case the adjustment at any one of the capacity points effected any other adjustment.

While a particular embodiment has been shown and described, modifications may be made, and it is intended in the appended claims to cover all such modifications as may fall within the true spirit and scope of the invention.

What is claimed is:

1. In a weighing scale apparatus of the type which includes a platform upon which a load to be weighed is placed, a resilient means coupled to the platform and to a stationary portion of the scale for causing the platform to be displaced from a reference position by an amount related to the weight of the load on the platform, and weight indicating means coupled to the platform for indicating the weight of the load on the platform responsive to the degree of platform displacement, the improvement of a balancing means for compensating for non-linearities in platform displacement to thereby cause the relation between load weight and platform displacement to be substantially linear comprising:
 a rotatable wheel having an axis of rotation;
 a lever arm pivoted at a pivot point at one end and coupled to said platform for being arcuately displaced by said platform;
 coupling means including a bow-shaped member at the other end of said lever and a ribbon having two ends and an inner elongated slot, said ribbon being wrapped about said wheel with a portion of said ribbon passing through said slot and said ends attached to said bow-shaped member for causing said wheel to rotate with platform displacement while minimizing friction by exerting only forces on said wheel which are transverse to said axis of rotation and said bow-shaped member being bowed away from said rotatable wheel and spaced from said rotatable wheel such that said ribbon acts upon said rotatable wheel at a point along an arc which is tangent to said rotatable wheel and which has its center at said pivot point;
 a shaft extending from said rotatable wheel having an axis of rotation concentric with that of said wheel; and
 a plurality of balance weights extending radially from said shaft and arcuately spaced apart from one another whereby,
 as said platform is displaced by a load on the platform, said wheel is rotated causing said balance weights to act upon the platform and resilient means to thereby render the load weight and platform displacement relationship substantially linear.

2. An apparatus in accordance with claim 1 wherein said transverse member is bow-shaped.

3. An apparatus in accordance with claim 2 wherein said bow-shaped member is bowed away from said rotatable wheel and spaced from said rotatable wheel such that said ribbon acts upon said rotatable wheel at a point along an arc which is tangent to said rotatable wheel and which has its center at said pivot point.

4. An apparatus in accordance with claim 3 wherein said bow-shaped member is resilient and under tension.

5. An apparatus in accordance with claim 4 wherein said ribbon comprises a first portion having a first width, a second portion having a second width, said second width being smaller than said first width and wherein said elongated slot is within said first portion and dimensioned for receiving said second portion.

6. An apparatus in accordance with claim 5 wherein said arcuately spaced balance weights are also longitudinally spaced apart along said shaft axis.

7. An apparatus in accordance with claim 6 wherein each said balance weight comprises a threaded portion for being received by said shaft to thereby render the relation between load weight and platform displacement adjustable with rotation of said balance weights.

8. An apparatus in accordance with claim 7 wherein said balance weights comprise a first balance weight, a second balance weight and a third balance weight for rendering the load weight and platform displacement relation substantially linear at one-fourth, one-half and three-fourths scale capacity.

9. In a weighing scale apparatus of the type which includes a platform upon which a load to be weighed is placed, a resilient means coupled to the platform and to a stationary portion of the scale for causing the platform to be displaced from a reference position by an amount related to the weight of the load on the platform and weight indicating means coupled to the platform for indicating the weight of the load on the platform responsive to the degree of platform displacement, the improvement of a balancing means for compensating for non-linearities in platform displacement to thereby cause the relation between load weight and platform displacement to be substantially linear comprising:
 a rotatable wheel having an axis of rotation;
 a lever arm pivoted at a pivot point at one end and coupled to said platform for being arcuately displaced by said platform;
 coupling means including a bow-shaped member at the other end of said lever and a ribbon having two ends and an inner elongated slot, said ribbon being wrapped about said wheel with a portion of said ribbon passing through said slot and said ends attached to said bow-shaped member for causing said wheel to rotate with platform displacement while minimizing friction by exerting only forces on said wheel which are transverse to said axis of rotation and said bow-shaped member being bowed away from said rotatable wheel and spaced from said rotatable wheel such that said ribbon acts upon said rotatable wheel at a point along an arc which is tangent to said rotatable wheel and which has its center at said pivot point;
 a shaft extending from said rotatable wheel and having an axis of rotation concentric with said wheel axis; and
 first, second and third balance weights extending radially from said shaft and arcuately spaced apart from one another; whereby
 as said platform is displaced by a load on the platform said wheel is rotated causing said first, second and third balance weights on said shaft to rotate about said shaft axis and to act upon the platform and resilient means at one-fourth, one-half and three-fourths scale capacity to thereby render the load weight and platform displacement relationship substantially linear over the entire capacity range of the scale.

* * * * *